Patented Mar. 1, 1949

2,463,282

UNITED STATES PATENT OFFICE 2,463,282

COATING COMPOSITION CONTAINING ANTISTATIC AGENT

Bun Po Kang, Kearny, N. J., assignor to E. I. du Pont de Nemours & Company, Wilmington, Del., a corporation of Delaware No Drawing. Application March 12, 1946, Serial No. 653,958

5 Claims. (Cl. 260—29.6)

This invention relates to anti-static coatings and more particularly to an improved anti-static coating for transparent surfaces.

Anti-static compositions for coating surfaces are known in the art but they are unsatisfactory for coating transparent articles because these compositions have poor optical properties. Most non-conductive materials when exposed to frictional forces collect electrostatic charges on their surfaces at the area of contact. Electrostatic charges are proven to accumulate on the surfaces of such insulating materials as vulcanized rubber, glass, plastic compounds and the like. This electrostatic charge is in many instances of an undesirable form because of its repulsive or attractive nature. Attractive electrostatic charges on these materials are particularly undesirable when they are employed for optical, mechanical and ornamental purposes because dust accumulates on them and seriously impairs their function.

An object of this invention is to provide an improved anti-static coating for transparent materials. A further object is to provide a clear anti-static coating for insulating transparent materials without interfering with the desirable properties thereof. A still further object is to provide a transparent article having a clear anti-static film superposed thereon. Other objects will be apparent from the description of the invention given hereinafter.

The above objects are accomplished according to the present invention by preparing a clear coating solution, comprising, by weight of the solution, 3%–4% of a partially hydrolyzed ethylene/vinyl acetate copolymer and 0.2%–6.0% of an anti-static agent consisting of an alkyl pyridinium halide, and the remainder consisting of an aqueous solution of from 45% to 55% of ethyl alcohol. the copolymer having having been hydrolyzed preferably with about 99% by weight thereof of water and containing 5% of ethylene before hydrolysis, moderate variations in the latter two percentages being permissible. The desired article, comprising a surface of a transparent organic plastic and superposed thereon a film of the above coating solution, may be prepared by dipping the plastic in the solution. The particular manner of applying this solution to a surface, whether by dipping or other suitable means, is not a part of the present invention.

The following examples illustrate specific embodiments of the instant invention. In each of the examples the resistance of the film was measured by balancing known areas between test electrodes against standard resistances.

Example I

A solution was prepared containing the following constituents:

|  | Per cent by weight |
|---|---|
| Lauryl pyridinium chloride | 5.96 |
| Ethylene/vinyl acetate copolymer hydrolyzed with 99% water and containing 5% ethylene before hydrolysis | 3.86 |
| Ethyl alcohol | 45.09 |
| Water | 45.09 |
| Total | 100.00 |

A polymeric methyl methacrylate sample 2 inches square and ⅛ inch thick was coated with this solution by dipping it in the solution and withdrawing at a constant rate of one foot per minute. The coating was removed from all surfaces except one and the remaining coating allowed to dry on the one surface. This dipping operation was repeated until a film 5 mils thick was obtained on the sample after which the sample was placed in an oven for one hour at 60° C. After storage at room conditions for 16 hours the resistance of this film was $1.5(10)^6$ ohms per square centimeter.

Example II

A film 10 microns thick was obtained by the procedure set forth in Example I. Immediately after oven drying, the resistance of this film was $3.0(10)^8$ ohms per square centimeter. After storage at room conditions for 16 hours the resistance dropped to $5.0(10)^7$ ohms per square centimeter.

It will be understood that the above examples are merely illustrative and that the invention broadly comprises a clear coating solution comprising, by weight thereof, 3%–4% of a partially hydrolyzed ethylene/vinyl acetate copolymer and 0.2%–6.0% of an anti-static agent consisting of an alkyl pyridinium halide, and the remainder consisting of an aqueous solution of from 45% to 55% of ethyl alcohol, the copolymer having been hydrolyzed preferably with about 99% by weight thereof of water and containing about 5% of ethylene before hydrolysis, moderate variations in the latter two percentages being permissible. The article according to the present invention comprises a surface of a transparent organic plastic and, superposed thereon, a film of the said coating solution.

Although this invention broadly includes as anti-static agents alkyl pyridinium halides and particularly those having from 8 to 18 carbon atoms, inclusive, in the alkyl radical, alkyl pyridinium chlorides are preferred, lauryl pyridinium chloride being specifically preferred. The proportion of the anti-static agent may be varied from 0.2% to 6.0%, inclusive, by weight of coating solution.

The proportions of the ethyl alcohol and water liquid medium should be approximately equal, that is, from 45% to 55% of either component, or, otherwise stated, there should be used an aqueous solution of from 45% to 55% ethyl alcohol.

The proportion of the partially hydrolyzed ethylene/vinyl acetate copolymer will be 3%–4% by weight of the coating solution. This copolymer will contain by weight thereof about 5% of ethylene and will be hydrolyzed preferably with about 99% by weight thereof of water, moderate variations in these percentages being permissible.

In order to realize completely the full advantages of the present invention the above percentages, including the permissible variations indicated herein, should be employed.

The invention is applicable to transparent organic plastic materials such as polymeric methyl methacrylate, styrene, cyclohexyl methacrylate and the like.

It is believed the mechanism of this invention may be attributed in part to the ability of the partially hydrolyzed ethylene/vinyl acetate copolymer to absorb moisture from the surrounding atmosphere and thereby furnish the alkyl pyridinium halide with moistened paths to ionize and conduct. Although the film becomes somewhat soft after a week's continuous exposure to 100% humidity, the softening does not cause adverse mechanical or optical effects. Moreover, it is obvious that practically no applications of the coated transparent organic plastic require exposures of this nature.

This invention is useful in the coating of articles of transparent organic plastics where any detectable amount of dirt collection is intolerable. It is particularly useful in instances where the finished article is to be subjected to impact and/or frictional forces in the presence of dirt particles such as is encountered in the normal usage of polymeric methyl methacrylate panes, lenses, and similar transparent plastics used for optical purposes. The unique combination of high optical transparency and superior anti-static properties of articles produced with the coating solution of this invention make it outstanding.

As many apparently widely different embodiments of this invention may be made without departing from the spirit and scope thereof, it is to be understood that the invention is not limited to the specific embodiment thereof except as defined in the appended claims.

I claim:

1. A clear coating solution adapted for providing anti-static coatings comprising by weight of said solution 3%–4% of a partially hydrolyzed ethylene/vinyl acetate copolymer, 0.2%–6.0% of an anti-static agent consisting of an alkyl pyridinium chloride having 8–18 carbon atoms in the alkyl radical, and the remainder consisting of an aqueous solution of from 45% to 55% of ethyl alcohol, said copolymer having been hydrolyzed with about 99% by weight thereof of water and containing about 5% of ethylene before hydrolysis.

2. A clear coating solution adapted for providing anti-static coatings comprising by weight of said solution 3%–4% of a partially hydrolyzed ethylene/vinyl acetate copolymer, 0.2%–6.0% of an anti-static agent consisting of lauryl pyridinium chloride, and the remainder consisting of an aqueous solution of from 45% to 55% of ethyl alcohol, said copolymer having been hydrolyzed with about 99% by weight thereof of water and containing about 5% of ethylene before hydrolysis.

3. An article comprising a surface of a transparent organic plastic and, superposed thereon, a film of the coating solution set forth in claim 1.

4. An article comprising a surface of a transparent organic plastic and, superposed thereon, a film of the coating solution set forth in claim 2.

5. An article comprising a surface of transparent polymeric methyl methacrylate and, superposed thereon, a film of the coating solution set forth in claim 2.

BUN PO KANG.

REFERENCES CITED

The following references are of record in the file of this patent:

UNITED STATES PATENTS

| Number | Name | Date |
|---|---|---|
| 2,343,095 | Smith | Feb. 29, 1944 |
| 2,386,347 | Roland | Oct. 9, 1945 |